(12) United States Patent
Englund et al.

(10) Patent No.: US 8,355,606 B2
(45) Date of Patent: Jan. 15, 2013

(54) ULTRAFAST AND ULTRALOW THRESHOLD SINGLE EMITTER OPTICAL SWITCH

(75) Inventors: Dirk Englund, Thousand Oaks, CA (US); Andrei Faraon, Menlo Park, CA (US); Jelena Vuckovic, Palo Alto, CA (US); Ilya Fushman, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 126 days.

(21) Appl. No.: 12/590,729

(22) Filed: Nov. 12, 2009

(65) Prior Publication Data
US 2010/0119193 A1 May 13, 2010

Related U.S. Application Data (60) Provisional application No. 61/199,091, filed on Nov. 12, 2008.

(51) Int. Cl.
*G02B 6/26* (2006.01)
*G02B 6/42* (2006.01)
*H01L 29/06* (2006.01)
*H01L 31/00* (2006.01)

(52) U.S. Cl. ........................... 385/16; 257/14
(58) Field of Classification Search ............ 385/16; 257/14, E29.168; 977/774
See application file for complete search history.

(56) References Cited

U.S. PATENT DOCUMENTS

| | | | |
|---|---|---|---|
| 6,768,131 B2 | 7/2004 | Rufenacht | |
| 7,031,585 B2 | 4/2006 | Soljacic et al. | |
| 7,076,138 B2 | 7/2006 | Rupasov et al. | |
| 2005/0152429 A1* | 7/2005 | Scherer | 372/92 |
| 2006/0126695 A1* | 6/2006 | Koyama | 372/50.124 |
| 2007/0194297 A1* | 8/2007 | McCarthy et al. | 257/14 |
| 2008/0101800 A1 | 5/2008 | Waks et al. | |
| 2011/0002574 A1* | 1/2011 | Bermel et al. | 385/3 |

OTHER PUBLICATIONS

Vuckovic, "Nonlinear optics at a single photon level with photonic crystal nanocavities", Aug. 1, 2007, Nonlinear Optics Meeting, Hawaii.

* cited by examiner

*Primary Examiner* — Jerry Blevins
(74) *Attorney, Agent, or Firm* — Lumen Patent Firm (57) ABSTRACT

Electrical control of the emitter of a coupled quantum emitter-resonant cavity structure is provided. Electrodes are disposed near a semiconductor quantum dot coupled to a semiconductor optical cavity such that varying an applied bias at the electrodes alters an electric field at the quantum dot. Optical input and output ports are coupled to the cavity, and an optical response of the device relates light emitted from the output port to light provided to the input port. Altering the applied bias at the electrodes is capable of altering the optical response. Preferably, the closest electrode to the cavity is disposed between or away from angular lobes of the cavity mode, to reduce loss caused by the proximity of electrode to cavity. The present approach is applicable to both waveguide-coupled devices and non-waveguide devices.

11 Claims, 7 Drawing Sheets

ULTRAFAST AND ULTRALOW THRESHOLD SINGLE EMITTER OPTICAL SWITCH

CROSS REFERENCE TO RELATED APPLICATIONS

This application claims the benefit of U.S. provisional patent application 61/199,091, filed on Nov. 12, 2008, entitled "Ultrafast and Ultralow Threshold Single Emitter Optical Switch", and hereby incorporated by reference in its entirety.

GOVERNMENT SPONSORSHIP

This invention was made with Government support under contract number N00014-06-1-0595-P0001 awarded by the Navy ONR and under contract number DAAD19-03-1-0199-P00003 awarded by the Army. The Government has certain rights in this invention.

FIELD OF THE INVENTION

This invention relates to optical switches, and more particularly to electrically controlled optical switches.

BACKGROUND

Resonant optical cavities in combination with quantum optical emitters have been under investigation for some time for various applications, such as switching and information processing. Photonic crystals (PCs) are a promising platform for implementing such structures. For example, in US 2008/0101800, dipole induced transparency of a PC resonant cavity coupled to a quantum dot (QD) is exploited to provide switching in the weak coupling, bad-cavity limit. Another example is considered in U.S. Pat. No. 7,031,585, where a PC atom-cavity system exhibits large nonlinear effects due to electromagnetic induced transparency.

Devices based on this technology often require an external control input to be provided to the emitter (e.g., atom or quantum dot) to control device operation. For example, the device transmittance from an optical input port to an optical output port can be altered by varying the control input, which can provide device functionality such as switching. However, it is critical that the control input be provided such that cavity and emitter losses are not significantly and undesirably increased. The reason for this is that coupled emitter-cavity devices typically rely on having low losses in order to provide the desired functionality.

This requirement of low loss significantly limits the possibilities for providing the control input. One approach that has been demonstrated is to provide the control input as an optical signal. Although this approach can provide low loss, it is not applicable in all situations.

Accordingly, it would be an advance in the art to provide coupled emitter-cavity devices that have an improved capability of controlling the emitter.

SUMMARY

In the present approach, electrical control of the emitter of a coupled quantum emitter-resonant cavity structure is provided. Electrodes are disposed near a semiconductor quantum dot coupled to a semiconductor optical cavity such that varying an applied bias at the electrodes alters an electric field at the quantum dot. Optical input and output ports are coupled to the cavity, and an optical response of the device relates light emitted from the output port to light provided to the input port. Altering the applied bias at the electrodes is capable of altering the optical response. Preferably, the closest electrode to the cavity is disposed between or away from angular lobes of the cavity mode, to reduce loss caused by the proximity of electrode to cavity. The present approach is applicable to both waveguide-coupled devices and non-waveguide devices. Potential applications include high speed and low power classical information processing (e.g., estimated RC time constant on the picosecond scale and energy-per-bit below 1 fJ). Quantum information processing is also an important application of the present approach.

BRIEF DESCRIPTION OF THE DRAWINGS

FIGS. 1$a$-$b$ show exemplary embodiments of the invention.
FIGS. 2$a$-$c$ show aspects of a first experiment.
FIGS. 2$d$-$e$ show photoluminescence results relating to the first experiment.
FIG. 4$a$ shows transmission spectra from the first experiment.
FIG. 4$b$ shows measured quantum dot wavelength vs. incident tuning laser power for the first experiment.
FIG. 5$a$ shows cavity transmission results for the first experiment.
FIG. 5$b$ shows time domain switching results for the first experiment.
FIG. 5$c$ shows modulation visibility vs. modulation frequency for the first experiment.
FIG. 6$a$ is a photograph of a sample used in a second experiment.
FIG. 6$b$ shows a measurement arrangement for the second experiment.
FIG. 6$c$ shows photoluminescence spectra relating to the second experiment.
FIG. 7$a$ shows further photoluminescence spectra relating to the second experiment.
FIG. 7$b$ shows broadband reflectivity spectra relating to the second experiment.
FIGS. 8$a$-$b$ are plots showing the measured quantum dot Stark effect vs. voltage and field for the second experiment.
FIG. 8$c$ is a plot of the cavity/QD coupling factor g vs. electric field for the second experiment.
FIG. 9$a$ shows broadband reflectivity spectra for the second experiment.
FIG. 9$b$ shows time-domain switching results for the second experiment.

DETAILED DESCRIPTION

Figure 1A:
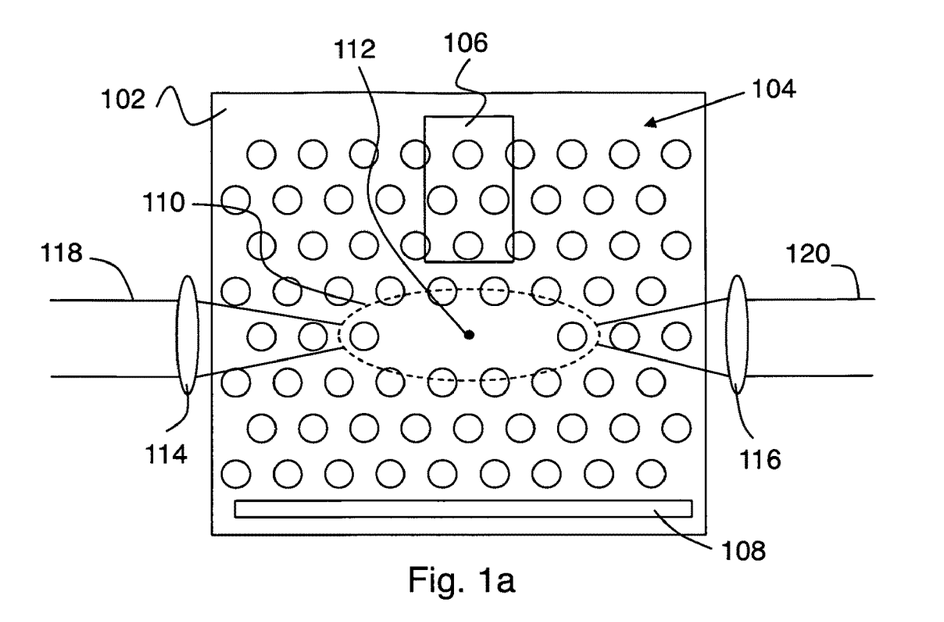

FIG. 1$a$ shows an embodiment of the invention. In this example, a semiconductor membrane 102 has a 2-D photonic crystal structure caused by hole array 104. A cavity is formed in the photonic crystal by making a defect (in this example, the defect is the three missing holes at the center of FIG. 1$a$). A semiconductor quantum dot 112 is disposed in and coupled to this resonant optical cavity. The lowest order mode of the cavity has a mode pattern which is schematically indicated by dotted line 110. Electrodes 106 and 108 are disposed such that altering an electrical potential difference applied between the electrodes alters the electric field at quantum dot 112. An optical response of the device (i.e., transmission from an input port to an output port) can be altered by varying the bias applied to the electrodes.

Figure 1B:
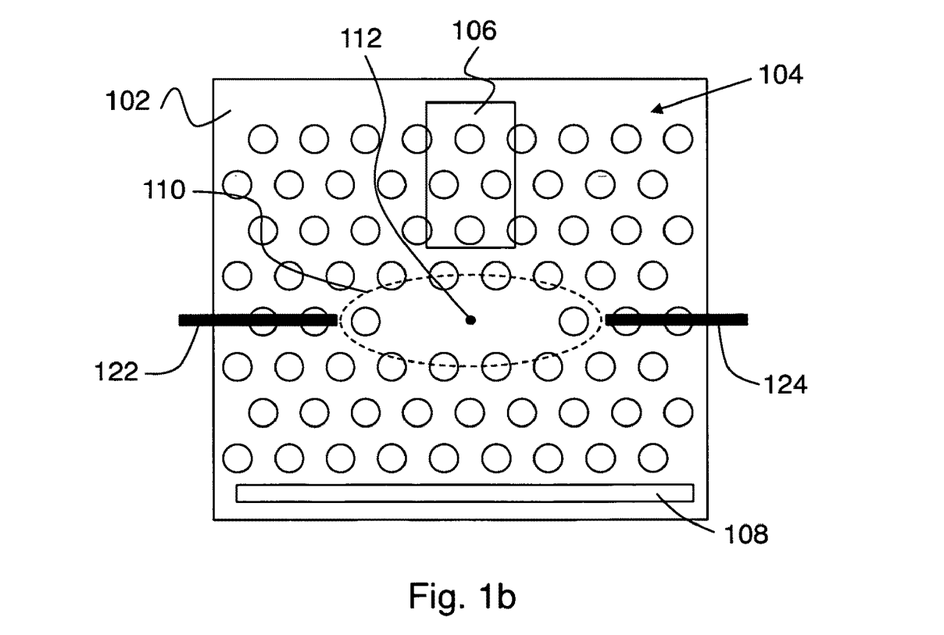

The optical input and output ports can be defined in various ways. In the example of FIG. 1a the ports are defined by mode matching optics 114 and 116 that match input beam 118 and output beam 120 to the optical cavity. In the example of FIG. 1b, the ports are defined by input waveguide 122 and output waveguide 124. In some cases, waveguide-coupled devices can include mode matching optics to more efficiently match the waveguide modes to the cavity mode.

The placement and design of electrodes can strongly affect the device operation and performance. In most cases, the cavity mode has a mode pattern that has angular lobes (i.e., does not have a circular/spherical radiation pattern that is the same in all directions). For example, FIGS. 1a-b show a cavity mode having two lobes extending to the left and right on the figures. In such cases, it is preferred for the electrode that is closest to the cavity (i.e., electrode 106) to be disposed away from or between the angular lobes of the cavity mode. By positioning the close electrode in this manner, losses introduced by the proximity of electrode to cavity can be reduced compared to the case of an electrode located the same distance from the cavity but aligned with a mode pattern lobe.

This is an important consideration in practice, because it is necessary to get an electrode very close to a quantum dot (i.e., within ~1 μm) in order to be able to control the electric field at the quantum dot. An electrode that is further away from the quantum dot will not provide an electric field at the dot because of screening by mobile charges in the semiconductor. Surprisingly, we have found that by disposing an electrode as described above (i.e., away from mode lobes), the electrode can be brought close enough to electrically control the quantum dot without measurably increasing the cavity loss.

At the same time, for ultra-low energy electro-optic switching it is crucial that the electric field that tunes the quantum dot is applied within a very small volume. Bringing the electrode close to the center of the cavity without perturbing the optical properties of the device is key in achieving ultra-low switching energies.

In the example of FIGS. 1a-b, the electrodes are lateral Schottky electrodes. It is also possible for the electrodes to be anode and cathode of a p-i-n diode (e.g., as shown on FIG. 2c). In the latter case, the capacitance of the device can be minimized by patterning the electrodes to align with the electromagnetic field distribution of the fundamental mode of the cavity. Altering the optical response of the device can provide amplitude modulation, phase modulation or any combination of amplitude and phase modulation, depending on details of device design. The quantum dot and cavity each have their respective resonant frequencies, and device operation depends on the relative tuning of the dot and cavity. Prior to operation, it is important to bring the quantum dot onto resonance with the cavity using some slow tuning method. The cavity resonance and/or quantum dot resonance can be tuned. Suitable tuning methods include temperature tuning, strain tuning, electric field tuning, magnetic field tuning, and refractive index tuning. Material deposition techniques can be employed to alter refractive index. In this work, the slow tuning of the quantum dot relative to the cavity is distinct from the capability of fast switching of the cavity transmission by electrically changing the quantum dot-cavity interaction.

It is preferred that the system operate in the strong coupling regime, i.e. $g > \kappa/2$ and $g > \gamma$, where g is the vacuum Rabi frequency of the quantum dot, $\kappa$ is the cavity mode decay rate, and $\gamma$ is the dipole decay rate of the quantum dot. The present approach is also applicable in the Purcell (Dipole Induced Transparency) regime where $g^2 > \kappa\gamma$, and g can be smaller than the cavity decay rate $\kappa$. This regime is easier to achieve in practice than the strong coupling regime. However, the device operation speed (bandwidth) is smaller in that case, as it is limited by $g^2/\kappa$, as opposed to the strong coupling regime where it is limited by g or $\kappa$, whichever is smaller.

The following two sections describe two experiments that have been carried out to demonstrate various aspects of the present approach. In the first experiment, a quantum dot coupled to an optical cavity is disposed in a vertical p-i-n diode that has a built-in electric field. This built-in field is altered by illuminating the p-i-n diode with a tuning laser. As power provided by the tuning laser increases, the built-in electric field decreases. In the second experiment, direct electrical switching of a quantum dot in a cavity is provided using lateral Schottky contacts.

First Experiment: Vertical p-i-n Junction

The sample is grown by molecular beam epitaxy. A 160-nm thick, GaAs membrane contains a central layer of self-assembled InAs Us with a density of ~50/μm². The single exciton emission of the dots is distributed around 910-940 nm. The GaAs membrane is doped to form a vertical p-i-n diode with the QD layer in the intrinsic region as shown on FIG. 2c. Both p and n regions have a doping concentration near $10^{18}/cm^3$. Here 220 is a 22 nm thick p-region, 228 is a 31 nm thick n-region, 222 is a 51 nm thick i-region, 226 is a 42 nm thick i-region, and 224 is the QD layer. The photonic crystal (PC) structures are then fabricated by a combination of electron beam lithography and dry/wet etching steps.

Figure 2A:
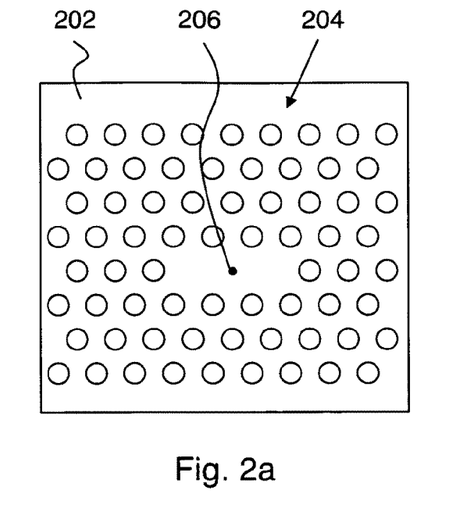

The optical system considered here includes a self-assembled InAs quantum dot (QD) 206 coupled to a three-hole defect (L3) PC cavity, as shown on FIG. 2a. Here 202 is the GaAs membrane, and 204 is the pattern of holes that provides a 2-D photonic crystal. The cavity design is based on the work of Akahane et al. (Nature 425, 944-947, 2003, incorporated by reference in its entirety), but is modified with a set of perturbations to increase the directionality of the radiated field. These perturbations are described in greater detail by Toishi et al. ("High-brightness single photon source from a quantum dot in a directional-emission nanocavity," Optics Express 17(17), 14618-14626, 2009, incorporated by reference in its entirety). Since the perturbations introduce some additional photon loss, the cavity quality factor is only 6000, somewhat lower than unperturbed cavities in similar experiments. The sample is cooled to 20-50 K inside a continuous-flow cryostat and analyzed in the confocal microscope setup illustrated in FIG. 2b. Cooling was employed due to the particular nature of the quantum emitters in this experiment. Emitters operating at room temperature (e.g., NV centers in diamond, or other types of quantum dots with deeper confining potential) can be employed if they result in an optical interaction that yields the desired modulation characteristics.

Figure 2B:
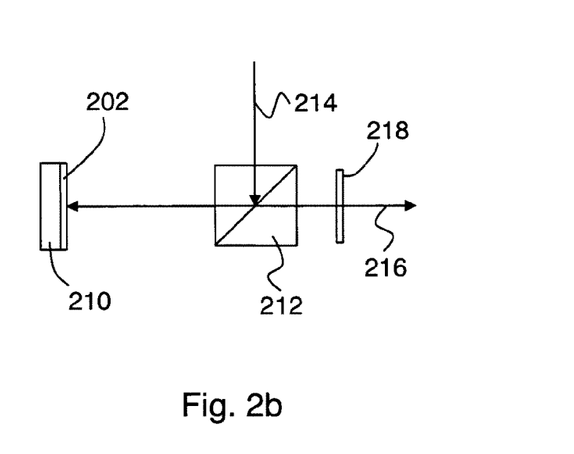
Figure 2C:
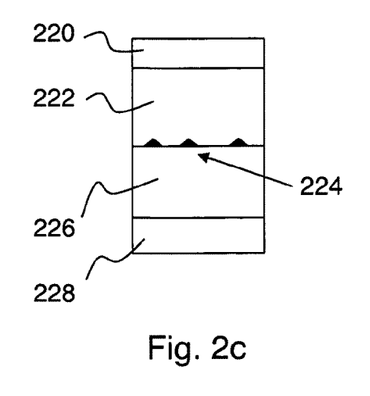

In the experiment, a signal laser (at $\lambda_s$~920.5 nm) and a tuning laser ($\lambda_t$~780 nm) are incident on the cavity in membrane 202 with vertical polarization. The cavity is linearly polarized at 45° from vertical and is backed by a distributed Bragg reflector 210, effectively creating a single-sided cavity. The modulated signal beam 216 is measured in the horizontally polarized output port after a 900 nm long pass filter 218. A polarizing beam splitter 212 is used to separate the vertically polarized inputs 214 (i.e., signal and tuning inputs) from the horizontally polarized output 216.

Figure 2D:
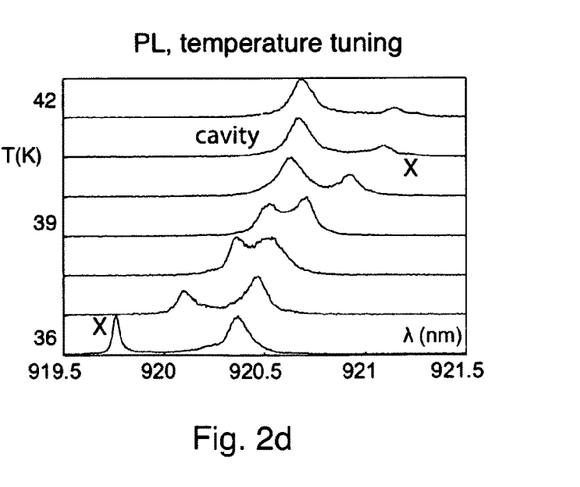

As shown in the photoluminescence (PL) in FIG. 2d, the QD- and cavity-like states anticross as the QD is thermally tuned through the cavity. The QD is pumped through higher-order excited states by optical excitation at a wavelength of $\lambda_e$=873 nm. The vacuum Rabi splitting of 0.16 nm exceeds the cavity linewidth (0.15 nm), indicating that the QD/cavity system is in the strong coupling regime.

The dot is tuned in the p-i-n junction by a process that we identify as the DC Stark shift. This shift has been demonstrated previously using electrical contacts to control an electric field across the QD. However, to facilitate testing of many devices inside the cryostat, we instead modulate the built-in DC electric field in the p-i-n junction optically, by photogenerated charge separation across the PC membrane. The charge carriers are created with a 'tuning' laser at wavelength $\lambda_t=780$ nm and power $P_t$ in the microwatt range. The beam is focused to ~5 μm to cover the PC structure.

Figure 2E:
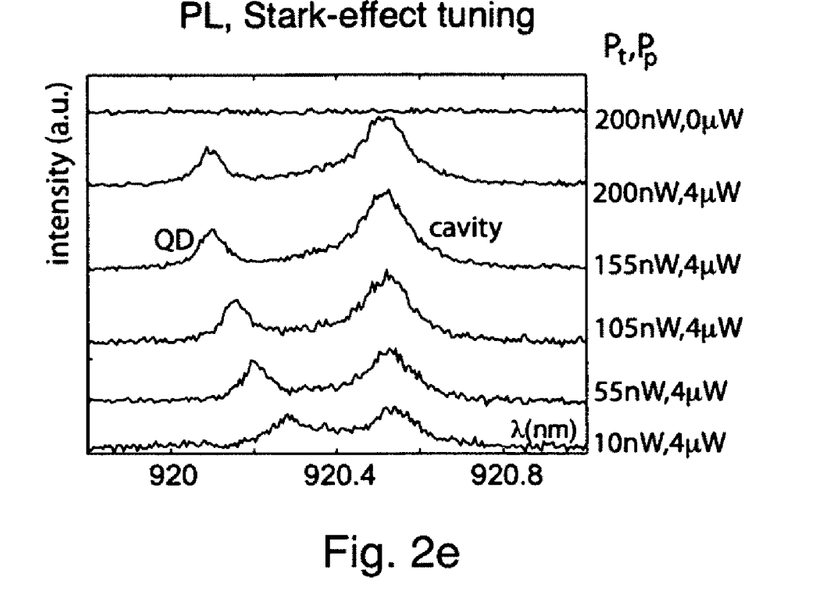
Figure 3:
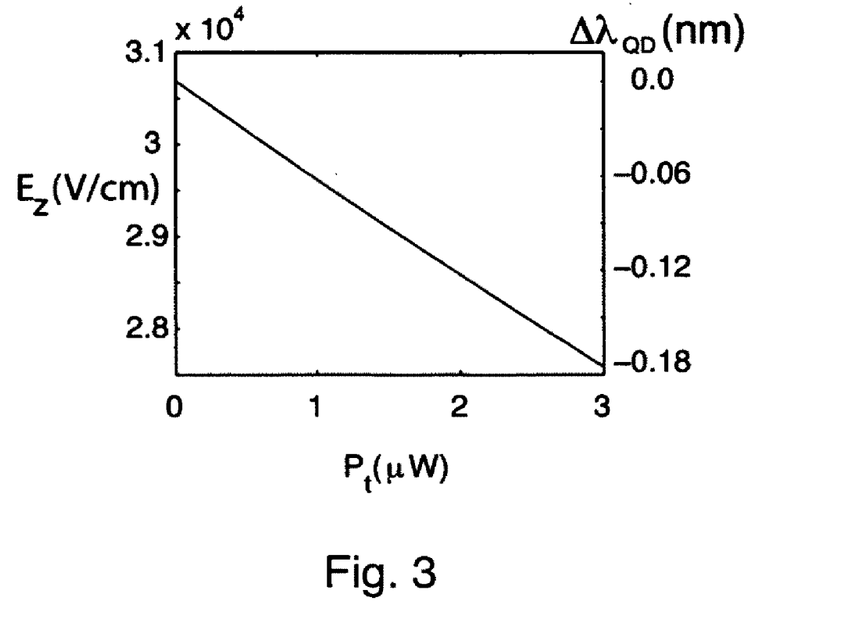
FIG. 3 shows electric field and quantum dot detuning vs. incident tuning laser power for the first experiment.

A simulation of the built-in electric field across the p-i-n junction was made. The QD layer is located near the electric field maximum of ~20 kV/cm. In the simulation, a source term models the photogenerated carrier density by $P_t(\hbar\omega_t V_t)$, where $V_t$ is the volume on which the tuning laser is incident. The simulated electric field is used to calculate the expected Stark shift on the QD, and these simulation results are given on FIG. 3. In the simulation, the tuning laser spot is assumed to be Gaussian with a FWHM of 5 μm; doping concentrations in the membrane are as given above in connection with FIG. 2c; and carrier generation, diffusion, and drift are solved for simultaneously using a commercial software package. From the model, we therefore expect a change in the QD wavelength of $\Delta\kappa_{QD}$~0.1 nm at a tuning laser power of ~1 μW. To characterize the electric field across the p-i-n junction and its effect on the QD, we plot in FIG. 2e the photoluminescence (PL) when the tuning laser power $P_t$ is increased from zero to 200 nW. We simultaneously create carriers in the QD in the PC with a pump laser at 860 nm at a power of $P_p$=4 μW, measured before the objective lens. The pump laser is not absorbed in the bulk GaAs since its frequency is below the bandgap, and therefore the pump laser is not expected to significantly affect the bias voltage across the QD. The QD/cavity system is initially tuned on resonance by temperature, so we observe two nearly equally intense polariton modes (bottom plot in FIG. 2e). When $P_t$ is raised, the system detunesz as the QD transition frequency is blue-shifted. We note that the tuning laser itself does not appreciably contribute to the QD photoluminescence: when the pump laser is turned off, the PL vanishes.

We describe now how the cavity transmission is measured and controlled by the QD. As illustrated in FIG. 2b, an external, vertically polarized (|V>) probe beam (on path 214) is coupled into the cavity, which itself is linearly polarized at 45° (|V+H>/√2). The reflection 216 is measured in the horizontal polarization(|H>) to reduce the uncoupled background field. This reflectivity measurement may be equivalently viewed as a cavity transmission measurement from the vertical (|V>) to horizontal (|H>) polarization. Other switching configurations can be employed. For example, the input signal could be in/out-coupled to a cavity in a lateral direction (in the chip plane) via a waveguide, as in a paper by Faraon et al., "Dipole induced transparency in waveguide coupled photonic crystal cavities", Optics Express, Vol. 16, pp 12154-12162 (2008), incorporated by reference in its entirety.

Figure 4A:
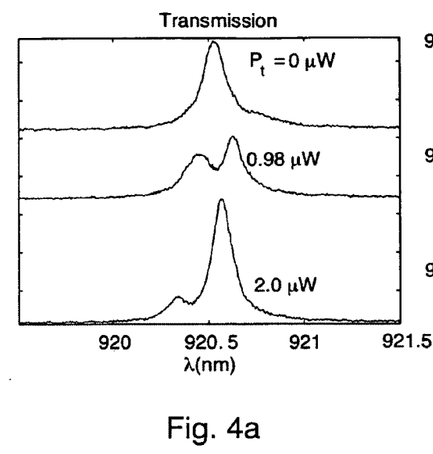
Figure 4B:
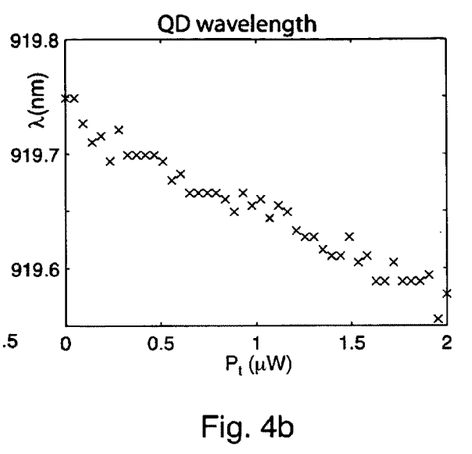

The transmission function is first probed using a broadband light source. The spectra in FIG. 4a show the strong contrast in the transmission spectrum as the QD is tuned from the red-detuned starting point ($P_t$=0) onto resonance with the cavity ($P_t$~1 μW) to the blue-detuned condition at $P_t$=2 μW. In FIG. 4b, we plot the actual QD wavelength which is extracted from a fit to the transmission spectra. Comparing these observations with our theoretical model, we find good agreement: at a tuning power of 2 μW, the QD shift is $\Delta\mu_{QD}$~−0.16 nm, close to the calculated value of −0.12 nm. We do not expect perfect agreement since the carrier distribution in the model is only a rough approximation, but we find that the model adequately describes the tuning behavior of the QD.

Figure 5A:
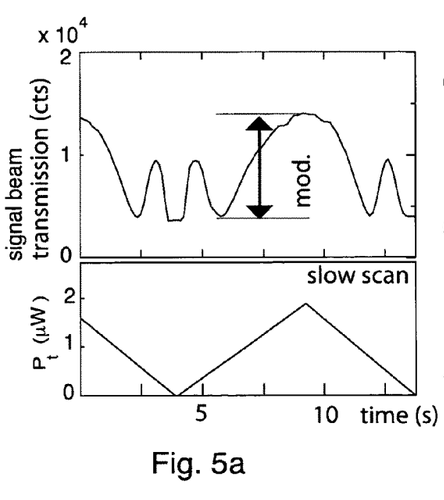

Although the broad-band transmission shows the electric field dependence of the QD single exciton wavelength, the spectral features are limited by the resolution of the spectrometer (~0.03 nm). To increase the resolution, we replace the broad-band source with a narrow-band laser that is tuned near the QD transition. The narrow-band (linewidth<10 MHz) probe laser is coupled into the cavity and the QD is then tuned across the cavity resonance by the electric field. Pump laser power is 4 μW, $P_t$ is varied between 0 and 2 μW, and the probe laser power is ~2 nW. In FIG. 5a, we plot the observed probe transmission (top plot) as the QD is tuned through the cavity (bottom plot). Large contrast is observed as the QD is tuned through the cavity resonance. We note that the PL from the QD is negligible in the transmission—it is 160 times weaker than the intensity of the transmitted probe at maximum.

Figure 5B:
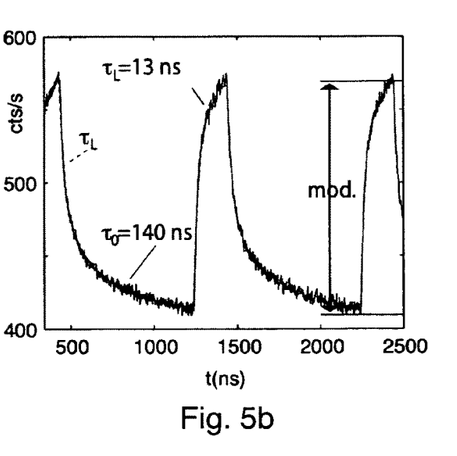
Figure 5C:
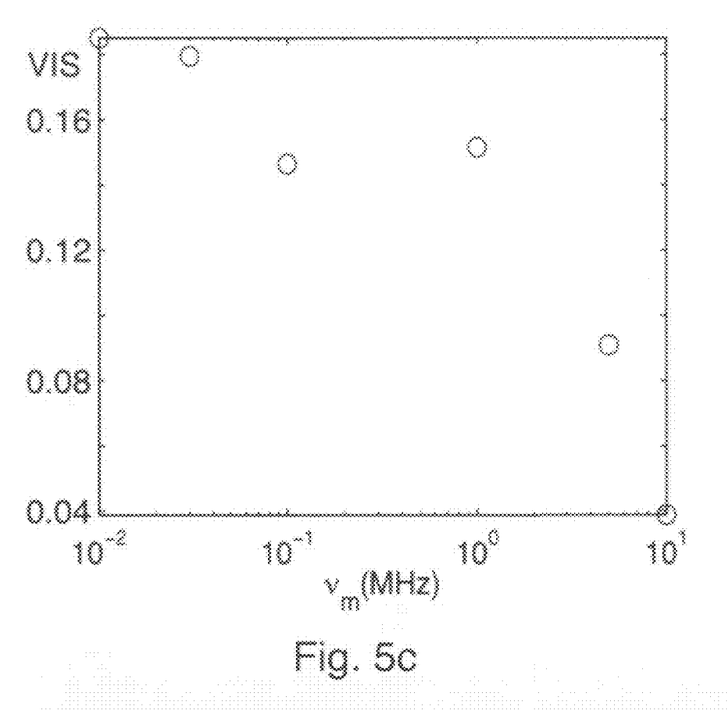

To measure the modulation speed, the narrow probe laser is tuned to the cavity resonance while the QD is shifted between the positions corresponding to the highest and lowest transmission values in FIG. 5a. The tuning laser is modulated with a square wave envelope between 0.5 μW and 2 μW at a frequency $\nu_m$. The time-resolved transmission is then measured on an avalanche photodiode. FIG. 5b is a plot of the measured photodiode count rate I for a modulation speed of $\nu_m$=1 MHz. To better resolve the time-dependent features, we used a duty cycle that keeps the QD detuned from the cavity (high transmission) for 20% of each period. Two time-scales are responsible for the time domain data shown in FIG. 5b: a response time of $\tau_L$~13 ns corresponding to the modulation bandwidth of the tuning laser; and a slow relaxation time of $\tau_0$~140 ns. Because of the long relaxation time, we expect a high frequency cutoff near 7 MHz; this is confirmed by a measurement of the modulation visibility VIS=(max(I)−min (I))/(max(I)+min(I)) with frequency, which indicated a cut-off near 5 MHz as seen on FIG. 5c. $\tau_0$ is much longer than the approximate RC response time of the capacitive layer (~10 ns) and the diffusion time of the carriers. We speculate that trapped charges, potentially in nearby quantum dots, contribute to the screening of the field across the p-i-n junction, but the exact mechanism is presently not clear. The visibility in the pulsed measurement is considerably lower than the values obtained under slow tuning (for instance, the visibility in FIG. 4a reaches VIS~0.61 and a corresponding modulation depth of ~6.3 dB). A major factor in the reduced visibility is drifting of the alignment of the tuning and probe lasers, which made it difficult to maintain the optimal transmission contrast during the data acquisition; the stability could be improved in waveguide-coupled designs. We also note that we did not observe frequency broadening of the transmitted field and we expect chirp to be small, as is typical of electrorefractive modulators.

The modulation speed of the device is determined by two factors: the electrical bandwidth corresponding to the contacts, and the inherent 'optical bandwidth' corresponding to the response of the coupled QD-cavity system. As mentioned above, the electrical bandwidth appears limited in the present device by trapped charge states which may be reduced by improved material growth and processing. The bandwidth is additionally limited by the contact's RC time constant, which, however, could be as low as 10 ps. Meanwhile, the optical bandwidth is limited by the response time of the coupled QD-cavity system. In the weak-coupling regime, this limit corresponds to the scattering rate of the QD, given by the modified QD spontaneous emission rate $F\Gamma_0$, where F denotes the Purcell factor and $\Gamma_0$ is the natural decay rate of the QD. From lifetime measurements of uncoupled QDs, we estimate $\Gamma_0 \sim 1$ GHz. In the strong coupling regime, the QD-cavity coupling rate g exceeds the cavity field and QD dipole decay rates, $g > \kappa$, $\Gamma_0/2$. The strongly coupled system's response rate is then limited by the cavity intensity decay rate $2\kappa$, corresponding to $\kappa/\pi \sim 50$ GHz. In the present device, the optical bandwidth is clearly much faster than the electrical bandwidth and therefore does not limit the overall modulation speed.

To estimate the energy-per-bit, we consider the average applied power on the order of 1 μW at a modulation rate of ~5 MHz, giving an energy of 200 fJ/bit. This power could be reduced very substantially if the p-i-n region were defined at submicron length scale around the quantum dot, which should lower the capacitance below 1 fF. The quantum dot could be shifted through the cavity with a voltage below 100 mV. We therefore expect that switching powers below $CV^2 < 0.01$ fJ/bit may be achieved for the QD-cavity system; the actual device power consumption would then likely be dominated by losses in the external circuitry.

Second Experiment: Lateral Schottky

Figure 6A:
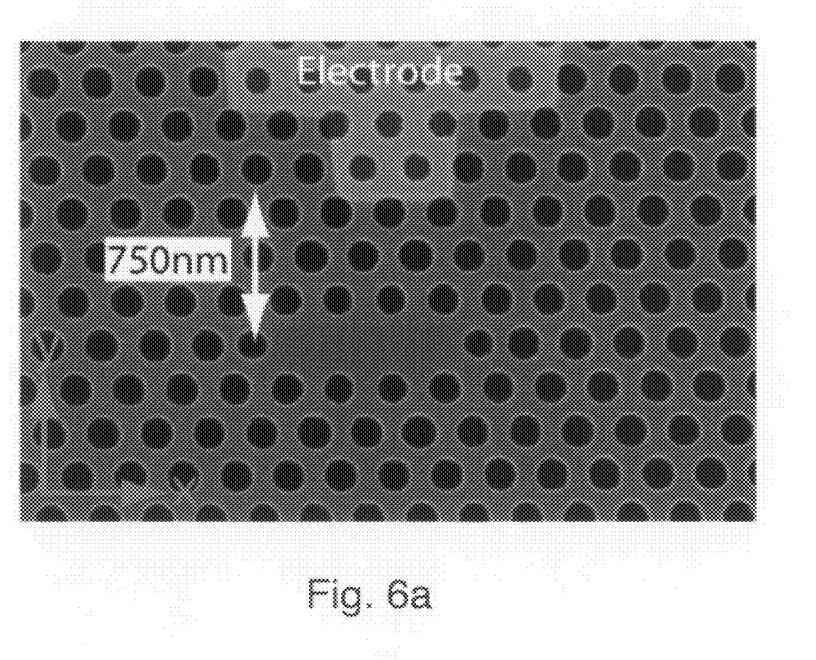

The device for this experiment includes an InAs quantum dot coupled to a linear three hole defect photonic crystal cavity (as described in greater detail in the above-cited paper by Akahane) fabricated in a 160 nm thick GaAs membrane (FIG. 6a). The electrical control was achieved by applying a lateral electric field across the quantum dot and thus shifting its resonant frequency via the QCSE. The field was created in the depletion layer of a Schottky contact (20 nm Cr/25 nm Au on GaAs) deposited in the vicinity of the quantum dot. A scanning electron microscope image of the photonic crystal resonator integrated with the laterally positioned electrode is shown in FIG. 6a. Another Schottky contact, located on the surface of the chip a few hundred microns away from the photonic crystal, was used to set the ground potential.

One challenge in designing the device is the small extent of the depletion layer in the vicinity of the Schottky contact. For typical undoped GaAs grown by molecular beam epitaxy, there is still a dopant concentration of $\sim 10^{16}/cm^3$ that limits the size of the depletion layer to a few microns for a 10V bias voltage. This requires the contact to be brought into a proximity of a few microns from the quantum dot embedded in the photonic crystal cavity. Since metals introduce high optical losses, the device was designed such that the metal electrode, located within ~1 μm from the center of the resonator, had a minimum overlap with the optical mode. The fundamental mode of the resonator extends mainly in a direction that makes an angle of ~30° with the cavity axis (x) and has a small extent in the y direction. To minimize the optical loss, the electrode was brought in the proximity of the resonator along the y direction and no significant degradation of the quality factor was observed. On the same chip, we measured electrically controlled resonators with quality factors as high as 17,000, similar to cavities without the metal electrode. The cavity studied in this letter had a lower quality factor (Q~4000) because it was integrated with a grating structure that allows efficient resonant in/out coupling from the resonator. This grating structure is described in greater detail in the above-cited article by Toishi et al.

Figure 6B:
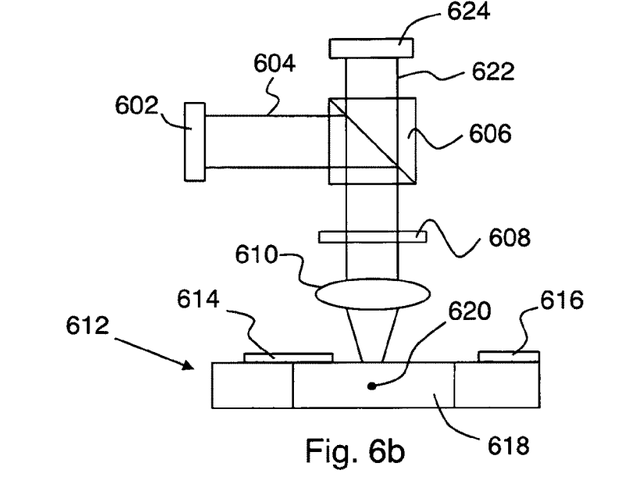

The photonic crystal was fabricated in a GaAs membrane. Metal contacts were defined using electron beam lithography followed by thermal evaporation and metal lift-off. The measurements were performed at cryogenic temperatures using a cross-polarized optical setup as shown in FIG. 6b.

In this setup, a cross-polarized confocal microscope includes a polarizing beam splitter 606, a half-wave plate 608, and an objective lens 610. The sample 612 includes a quantum dot 620 disposed in a cavity in a PC region 618 of the sample, as described above. Electrodes 614 and 616 provide an electrical field at the quantum dot which can be altered by changing the bias applied to the electrodes. A source 602 provides probe light 604 which impinges on sample 612 to provide output light 622 which is received by characterization apparatus 624. In this work, apparatus 624 included a spectrometer, a single-photon counting module (SPCM), and a flip mirror to select which instrument (i.e., spectrometer or SPCM) the output light was provided to.

Figure 6C:
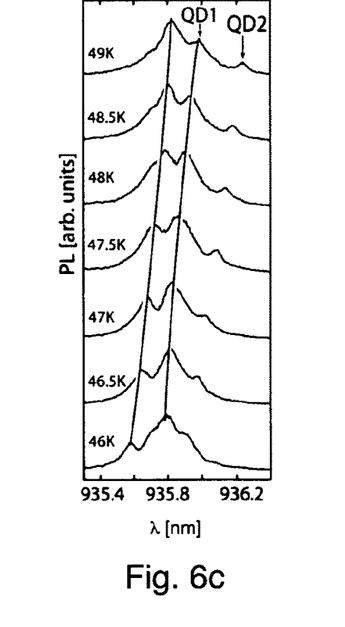

First, a photoluminescence (PL) measurement was performed to identify a strongly coupled QD. The signature of strong coupling is the vacuum Rabi splitting, observed (as seen on FIG. 6c) as an avoided crossing of the eigenstates of the system when the quantum dot is tuned into resonance with the cavity. From the PL spectra one could identify two quantum dots with frequencies close to the cavity resonance, labeled as QD1 and QD2 in FIG. 6c. Only QD1 showed the avoided crossing, thus indicating strong coupling. All the measurements reported in this section were done using QD1, but the signature of QD2 was still visible in some of the data sets. For clarity, QD1 is marked with an arrow in some of the following figures. The experimental data indicated a cavity quality factor Q~4000, corresponding to a field decay rate $\kappa/2\pi \sim 40$ GHz), and a quantum dot cavity coupling strength $g/2\pi \sim 20$ GHz. Since $g \gtrsim \kappa/2$ and $g >> \gamma$, (quantum dot spontaneous emission rate $\gamma/2\pi$ on the order of 0.1 GHz), the system operated on the onset of the strong coupling regime.

The vacuum Rabi splitting was also observed in the transmission function of the resonator, as measured using a cross-polarized reflectivity measurement (as described above in connection with FIG. 6b). Two types of resonant probing were used in this experiment. In one case, a continuous wave (CW) laser beam was scanned through the cavity resonance and the output was monitored with a photodetector. This measurement is referred as "CW reflectivity". In the second case, a broadband light source was coupled into the resonator and the entire reflectivity spectrum was monitored on a spectrometer. This measurement is referred as "broadband reflectivity".

Figure 7A:
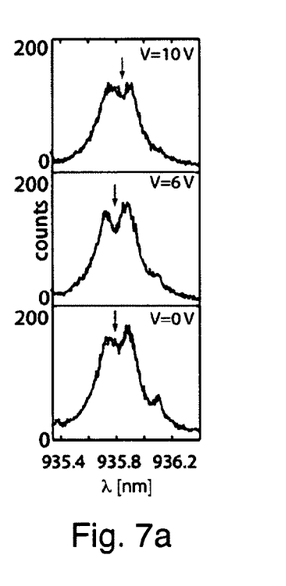

With the quantum dot and the cavity brought into resonance (temperature set to T=48K), the effect of the electric field was first studied in PL by changing the bias voltage from 0V to 10V. As the bias approached ~10V, the total PL intensity decreased and the quantum dot showed a red shift of only ~0.03 nm (0.04 meV) as shown in FIG. 7a. The shift in the QD resonance was due to the QCSE, and the reduction in the PL intensity was caused by the carriers being swept away before recombining in the QD. The Stark shift and the PL reduction were only observed when using low powers of the excitation laser (tuned at 875 nm). By increasing the intensity of the laser, more carriers were excited in the cavity and thus screened the electric field.

Figure 7B:
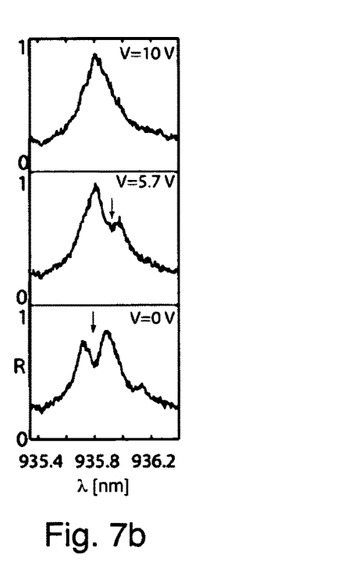

To test the effect of the electric field under resonant probing, the system was first measured using broadband reflectivity. A superluminescent diode with broad emission around 935 nm was used as the light source, thus minimizing free carrier generation because of its low spectral power density. As shown in FIG. 7b, the effect of the bias voltage on the QD wavelength was more pronounced than in the PL measurement. The Stark shift could be observed for bias voltages larger than V~4V, and for voltages exceeding V~7V the quantum dot was completely detuned from the cavity. As seen from FIG. 7b, by applying the electric field the transmission at the cavity resonance is switched from a local minimum to a local maximum.

The dependence of the quantum dot Stark shift with the applied bias voltage was extracted from the spectra of FIG.

Figure 8A:
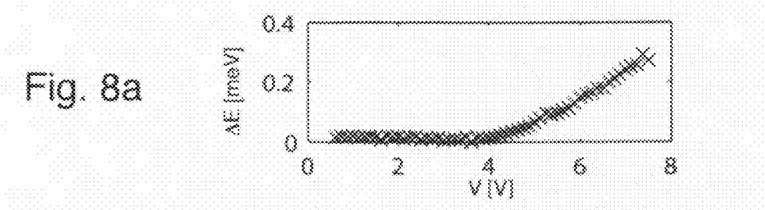
Figure 8B:
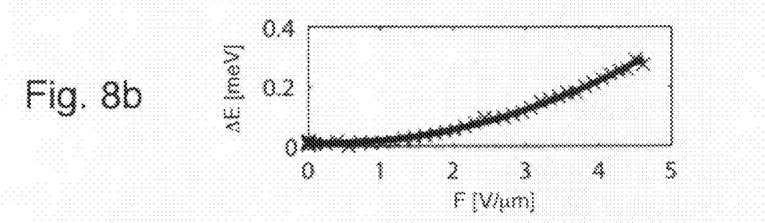

7b, and is shown in FIG. 8a. The Stark shift is only observed for voltages larger than V~4V, which corresponds to the depletion layer extending to the location of the quantum dot. The magnitude of the electric field in the center of the cavity was inferred by modeling the Schottky contact. The size of the depletion layer ($x_d(V)$) and the electric field in the cavity ($F(V)$) are given by $x_d=\sqrt{2\epsilon_0\epsilon_{GaAs}(V-\phi)/(eN_d)}$ and $F=-eN_d(x_d-\Delta x)H(x_d-\Delta x)/(\epsilon_0\epsilon_{GaAs})$. Here, $\Delta x=750$ nm is the distance between the electrode and the center of the cavity, $N_d=9\times10^{15}/cm^3$ is the doping concentration, $\phi=0.36V$ is the potential barrier of the Schottky contact, e is the electron charge, $\epsilon_{GaAs}=12.9$ is the dielectric constant of GaAs at low temperatures, $\epsilon_0$ is the electrical permittivity of vacuum, and $H(x)$ is the unit-step function. The effect of the surface states were not considered when estimating the electric field. The dependence of the energy shift with electric field is shown in FIG. 8b. The shift was quadratic in electric field, since the perturbation of the energy levels due to electric field is a second order effect. The data was fit using $\Delta E=pF-\beta F^2$ with $\beta=-0.015$ meV$\mu m^2/V^2=-2.4\times10^{-36}$ J/(V/m)$^2$ and $p=-0.009$ meV$\mu m/V=-1.4\times10^{-30}$ Cm. These values are within an order of magnitude but lower than previously measured by other research groups. We believe that the lower value that we estimate is caused by the QD not being located exactly in the middle of the cavity, as we assumed.

Figure 8C:
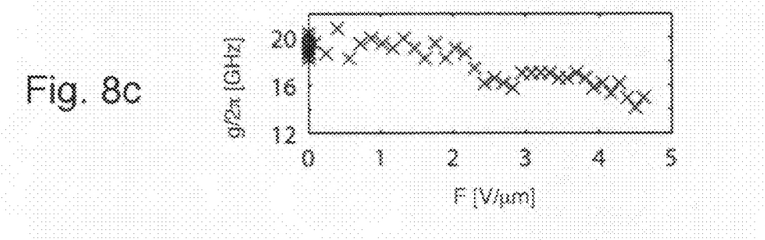

The confining potential of the quantum dot could be perturbed by the influence of the electric field. For the data set shown in FIG. 7b (taken at T=48K) the QD became completely off resonant with the cavity for V>7V so the reflectivity spectrum at high electric field yielded little information about the quantum dot. For a better investigation of the QD behavior at large electric fields, another data set was taken at T=46K such that the QD was resonant with the cavity for V>7V. Under bias voltage, the electron and hole wavefunctions were deformed and pulled in opposite directions thus reducing their overlap. This resulted in a reduction of the cavity/QD coupling g. The fits to the data showed that $g/2\pi$ decreased from ~20 GHz to ~15 GHz when a bias of ~7V was applied (FIG. 8c). For V>8V, the influence of the electric field was strong enough to completely erase the signature of the quantum dot from the broadband reflectivity spectrum. This could be either due to reduced g, or high tunneling rate of the electron-hole pairs out of the quantum dot placed in the electric field.

Figure 9A:
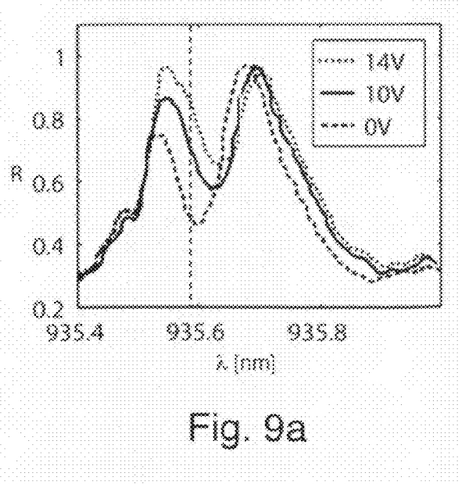

The CW reflectivity spectra for different values of the bias voltage are shown in FIG. 9a. The Stark shift was still present but its magnitude was smaller compared to the broadband reflectivity measurement (0.04 meV for V~10V), most probably due to carriers that screen the electric field. Unlike the broadband source, the CW laser coherently created excitons in the quantum dot. Due to the bias voltage, these electron-hole pairs could tunnel out of the quantum dot and become free carriers that screened the electric field. Alternatively, since more than one quantum dot was present in the cavity, the screening could also be caused by excitons created in the neighboring off resonant quantum dots. It has already been shown that these excitons could be created through the off resonant energy transfer between the photonic crystal resonator and the coupled quantum dots. The screening of the electric field became more pronounced with increasing laser intensity, thus affecting the device performance. The effect of the QD on the transmission function of the resonator can be observed for coupled probe powers as high as tens of nW, but manipulation of the QD via QCSE at those probe power levels still needs to be demonstrated and may be limited by electric field screening. The CW reflectivity spectra in FIG. 9a indicated that an on/off switching ratio of ~1.5:1 was achievable with this system when driven between 0V and 10V (on/off ratio of 2:1 achievable for 0V to 14V driving). Although on:off ratios of 100:1 are theoretically expected with this system, the experimentally observed on/off ratio was limited by the properties of the quantum dot, especially operation at the onset of the strong coupling regime, decoherence and QD blinking.

Figure 9B:
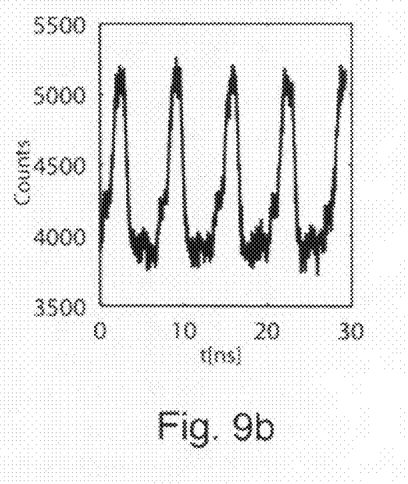

The time domain measurement was performed by setting the probe laser at the QD frequency (marked by the vertical dashed line in FIG. 9a) and by controlling the voltage using a function generator (0-10V signal). The modulated output was monitored using a single photon counting module (SPCM) and a dual channel picosecond time analyzer (PTA) synchronized to the function generator. To minimize the amount of screening due to coherently excited carriers, the probe laser power was set to ~10 pW. The switching behavior at 150 MHz is shown in FIG. 9b, with an on/off ratio of ~1.3:1. This is smaller than the expected ~1.5:1 because the 3 dB cutoff in the transmission line was at 100 MHz. An on/off ratio of 1.45:1 was observed when driving the system at 80 MHz, close to the value expected from the DC measurement.

The performance of the proof of concept device reported in this section is limited by the experimental setup and the non-ideality of the strongly coupled system. All-optical measurements on similar devices showed that speeds up to 10 GHz could be achieved with this type of system. With improved engineering, similar speeds should be achievable in electrical operation. Theoretically, when operating with g, $\kappa\gg\gamma$ (i.e. strong coupling regime or high Purcell factor regime) as is the case for quantum dots in photonic crystals, the maximum bandwidth is limited to $\min(g/\pi, \kappa/\pi)$ in the strong coupling regime and $g^2/(\pi\kappa)$ in the weak coupling regime. Regarding the energy required to shift the QD, it is fundamentally limited by the energy density of the electric field required to shift the quantum dot inside the active volume. Considering an active volume the size of the resonator ($V_a$~1 µm×1 µm×200 nm), and an electric field $F$~$5\times10^4$ V/cm, this translates into a switching energy of ~1 fJ, which is much lower than state of the art devices. Confining the electric field over such a small volume is not trivial, but suitable technological solutions may be found in the future.

The preceding description has been by way of example as opposed to limitation, and many variations of the preceding examples can be considered that follow the same general principles. For example, the optical cavity need not be a photonic crystal cavity. Any kind of semiconductor optical cavity (defined here as any cavity which can be coupled to a semiconductor quantum dot) can be employed. Suitable other cavity types include, but are not limited to micro-disks, micro-toroids, etc. Practice of the invention does not depend critically on the materials used for the quantum dot and cavity. Any semiconductor capable of being fabricated into quantum dots can be employed, and any resonator compatible with quantum dots can be employed. Practice of the invention does not depend critically on details of the optical input and output ports. Any method of getting light to and from the cavity can be employed.

The invention claimed is:

1. Apparatus for optical switching, the apparatus comprising:
    a semiconductor quantum dot;
    a semiconductor optical cavity coupled to said quantum dot;
    two or more electrodes, wherein altering an electrical potential difference applied between said electrodes alters an electric field at said quantum dot;

an optical input port coupled to said semiconductor optical cavity;

an optical output port coupled to said semiconductor optical cavity, wherein said apparatus has an optical response relating light emitted from said output port to light provided to said input port;

wherein altering said electrical potential difference is capable of altering said optical response by altering said electric field at said quantum dot;

wherein an optical mode of said optical cavity has a mode pattern having one or more angular lobes, and wherein at least one of said electrodes is disposed in proximity to said optical cavity and at an angular location between or away from said angular lobes.

2. The apparatus of claim 1, wherein said optical cavity comprises a photonic crystal structure.

3. The apparatus of claim 2, wherein said photonic crystal structure provides a photonic bandgap in two or more dimensions.

4. The apparatus of claim 1, wherein said two or more electrodes include an anode and cathode of a p-i-n diode.

5. The apparatus of claim 1, wherein said altering said optical response provides amplitude and/or phase modulation of light provided to said input port at said output port.

6. The apparatus of claim 1, wherein a relative tuning of said quantum dot with respect to said optical cavity can be altered using a tuning method selected from the group consisting of quantum dot resonance tuning and cavity resonance tuning.

7. The apparatus of claim 1, wherein a relative tuning of said quantum dot with respect to said optical cavity can be altered using a tuning method selected from the group consisting of temperature tuning, strain tuning, electric field tuning, magnetic field tuning, and refractive index tuning.

8. The apparatus of claim 1, wherein g is a vacuum Rabi frequency of said quantum dot, $\kappa$ is a cavity mode decay rate, $\gamma$ is a dipole decay rate of said quantum dot, and wherein $g>\kappa/2$ and $g>\gamma$.

9. The apparatus of claim 1, wherein g is a vacuum Rabi frequency of said quantum dot, $\kappa$ is a cavity mode decay rate, $\gamma$ is a dipole decay rate of said quantum dot, and wherein $g^2>\kappa\gamma$.

10. The apparatus of claim 1, wherein said input port and/or said output port comprise mode matching optics for matching an optical beam to said cavity mode.

11. The apparatus of claim 1, wherein said input port and/or said output port comprise optical waveguides.

* * * * *